United States Patent [19]
Funanami et al.

[11] Patent Number: 5,800,033
[45] Date of Patent: Sep. 1, 1998

[54] IMAGE PROJECTING APPARATUS

[75] Inventors: Yukiya Funanami; Yasuyuki Mitsuoka; Nobuyuki Kasama; Tadao Iwaki, all of Chiba, Japan

[73] Assignee: Seiko Instruments Inc., Japan

[21] Appl. No.: 548,455

[22] Filed: Oct. 26, 1995

[51] Int. Cl.⁶ .................................. G03B 21/14
[52] U.S. Cl. ........................................ 353/97
[58] Field of Search ..................... 353/88, 97; 349/5

[56] References Cited

U.S. PATENT DOCUMENTS

| 5,371,559 | 12/1994 | San-Nohe et al. | 353/97 |
| 5,379,083 | 1/1995 | Tomita | 353/97 |
| 5,541,679 | 7/1996 | Yang | 353/97 |

FOREIGN PATENT DOCUMENTS

| 488080 | 6/1992 | European Pat. Off. |
| 4208635 | 7/1993 | Germany |
| 5019346 | 1/1993 | Japan |
| WO 9107851 | 5/1991 | WIPO |

*Primary Examiner*—William Dowling
*Attorney, Agent, or Firm*—Adams & Wilks

[57] ABSTRACT

An image projecting apparatus comprises a light source for emitting light, a spatial light modulating element, an illuminating optical system for irradiating a light from the light source to the spatial light modulating element, and a projecting optical system for projecting an image of the spatial light modulating element. The illuminating optical system or the projecting optical system comprises a telecentric optical system and a light shielding frame disposed at a focus position of the telecentric optical system for controlling an angular component of a luminous flux of light emitted by the light source or the spatial light modulating element, respectively, to adjust the quality of the projected image.

15 Claims, 5 Drawing Sheets

IMAGE PROJECTING APPARATUS

BACKGROUND OF THE INVENTION

The present invention relates to an image projecting apparatus such as a liquid crystal projector, a projector etc.

FIG. 2 shows a structural view of a reflecting type liquid crystal image projecting apparatus as an example of a conventional image projecting apparatus.

The basic structure of the reflecting type liquid crystal image projecting apparatus is composed of a plurality of reflecting type optical writing liquid crystal light valves, writing means each for optically writing an image of each color component to each of the reflecting type light writing liquid crystal light valves by irradiating a writing light from one face side thereof, a polarized light illuminating optical system for irradiating polarized light illuminating luminous fluxes of corresponding color components from sides of faces opposite to faces on which writing lights from the respective reflecting type optical writing liquid crystal light valves are irradiated and reflectively reading images of the respective color components written in the reflecting type optical writing liquid crystal light valves and a projecting optical system for synthesizing, magnifying and projecting the read images of the respective color components thereby projecting an image.

First, an explanation will be given of structure of the reflecting type optical writing liquid crystal light valve that is used in the reflecting type liquid crystal image projecting apparatus. FIG. 3 is a sectional view showing the structure of the reflecting type optical writing liquid crystal light valve. Transference electrode layers 302a and 302b and orientation film layers 303a and 303b are provided on the surfaces of transparent substrates 301a and 301b such as glass or plastics for sandwiching liquid crystal molecules. The transparent substrates 301a and 301b on their respective sides of the orientation film layers 303a and 303b are opposed while controlling the clearance by interposing a spacer 309 thereby sandwiching a liquid crystal layer 304. Further, a photoconductive layer 305, a light shielding layer 306 and a dielectric mirror 307 are laminated between the transference electrode layer 302a on the side of writing by light and the orientation film layer 303a and reflectionless coating layers 308a and 308b are formed on outer faces of cells of the transparent substrate 301a on the side of writing and the transparent substrate 301b on the side of reading. As liquid crystals of the liquid crystal layer 304, nematic liquid crystals or ferroelectric liquid crystals etc. are used. Especially, a reflecting type liquid crystal light valve using ferroelectric liquid crystals is provided with a very fast operational speed of several hundreds Hz or more. Although it is known that the reflecting type light writing liquid crystal light valve using the ferroelectric liquid crystals is a device for thresholding and making binary an input image, it is possible to perform a gray scale display by devising the waveform of a drive voltage.

In reading an image written in such a reflecting type optical writing liquid crystal light valve, firstly, a polarized light component of a luminous flux is limited to a linearly polarized light, for example, a s polarized light component formed by a polarizing plate etc. that is irradiated on the reflecting type optical writing liquid crystal light valve. Only a linearly polarized light of a luminous flux reflected by the reflecting type optical writing liquid crystal light valve that is orthogonal to the polarization axis of the linearly polarized light of the incident luminous flux, for example, a p polarized light component, is transmitted through a polarizing plate etc. by which the written image can be read as intensity information. The image read in such a way becomes a positive image.

Next a specific explanation will be given of the structure of the reflecting type liquid crystal image projecting apparatus in reference to FIG. 2.

This reflecting type liquid crystal image projecting apparatus is composed of three sheets of reflecting type optical writing liquid crystal light valves 221, 231 and 241. That is, the apparatus includes a reflecting type optical writing liquid crystal light valve (hereinafter, R-SLM) 221 allocated with a red image among those having three elementary colors of red, green and blue, a reflecting optical writing liquid crystal light valve (hereinafter, G-SLM) 231 allocated with a green image and a reflecting type optical writing liquid crystal light valve (hereinafter, B-SLM) 241 allocated with a blue image. This reflecting type liquid crystal image projecting apparatus includes TFT liquid crystal panels 223, 233 and 243 and writing lenses 222, 232 and 242 as writing means of the respective images of the respective color components and a red component image displayed by the R-TFT 223 is optically written on a writing face of the R-SLM 221 by the R-writing lens 222. Similarly, a green component image displayed by the G-TFT 233 is optically written on a writing face of the G-SLM 231 by the G-writing lens 232. Further, a blue component image displayed by the B-TFT 243 is optically written on a writing face of the B-SLM 241 by the B-writing lens 242.

Meanwhile, the apparatus includes as a polarized light illuminating optical system a light source 201, an illuminating lens system 202, a polarized beam splitter (hereinafter, PBS) 203, a red reflecting dichroic mirror (hereinafter, R-DM) 204 and a blue reflecting dichroic mirror (hereinafter, B-DM) 205. A luminous flux emitted from the light source 201 becomes an illuminating luminous flux irradiated on the reflecting type optical writing liquid crystal light valves 221, 231, and 241 by the illuminating lens system 202. The illuminating light flux is split into mutually orthogonal polarized illuminating fluxes by the PBS 203. When one polarized illuminating flux reflected by the PBS 203 is, for example, a s polarized light, the other polarized illuminating luminous flux transmitted through the PBS 203 becomes a p polarized light. Only a red component of the s polarized light component separated by the PBS 203 is selectively reflected by the R-DM 204 which is irradiated on the R-SLM 221 and reflectively reads a red component image. The remaining color component transmitted through the R-DM 204 is separated into a green component and a blue component by the B-DM 205. A green component transmitted through the B-DM 205 is irradiated on the G-SLM 231 and reflectively reads a green component image.

Meanwhile, the blue component reflected by the B-DM 205 is irradiated on the B-SLM 231 and reflectively reads a blue component image. The three kinds of the red component image, the green component image and the blue component image which have been read in this way, are again synthesized by the B-DM 205 and the R-DM 204, the synthesized transmits through the PBS 203 and is magnified and projected on a screen 212 in front via a projecting lens 211. As a result, an image is projected on the surface of the screen 212.

However, the following problems are associated with the conventional image projecting apparatus.

(1) The adjustment of the image quality of the projected image, for example, the adjustment of the brightness or the contrast etc. is performed by electrically controlling the light source or the liquid crystal panels etc. by which the intensity of light is changed. However, in this method the adjustment is difficult and causes deterioration of the light source etc.

(2) In case of the image projecting apparatus using the reflecting type liquid crystal panels as mentioned by using FIG. 2, the linear polarized light component irradiated on the reflecting type optical writing liquid crystal light valves, for example, the s polarized light component is converted into the p polarized optical component by the reflecting type optical writing liquid crystal light valves in correspondence with the optically written image information and is reflected, and only the reflected p polarized light component transmits through the polarized beam splitter and is projected as an image. That is, the brightness, the contrast etc. of the projected image are much dependent on the characteristic of the polarized light beam splitter and the adjustment of these image qualities cannot be performed only by an electrical adjustment of the light source, the liquid crystal panel or the like.

(3) It is necessary to adjust the brightness, the contrast or the like of the projected image by an environment surrounding the image projecting apparatus or the projected image, depending on, for example, a variation in brightness caused by switching ON and OFF an illumination in a room. In that case, it is difficult to adjust the image qualities of the projected image in conformity with the variation in the surrounding environment.

Accordingly, it is an object of the present invention for resolving the conventional problems to provide an image projecting apparatus capable of adjusting image qualities of a projected image in conformity with a variation in a surrounding environment, easily and without deteriorating a light source, a space light modulating element or the like.

SUMMARY OF THE INVENTION

To solve the above problems, the present invention provides an image projecting apparatus including a light source, a spatial light modulating element, an illuminating optical system for irradiating a light from the light source to the spatial modulating element and a projecting optical system for projecting an image of the spatial light modulating element, wherein the illuminating optical system or the projecting optical system is composed of a telecentric optical system, a light shielding frame capable of changing a circular or a polygonal shape centering on an optical axis is provided at a focus position of the telecentric optical system and further, the image projecting apparatus includes an environment detecting means for detecting an environment surrounding the image projecting apparatus or the projected image and a light shield frame shape changing means for changing a shape of the light shielding frame in correspondence with a result of detecting by the environment detecting means.

DETAILED DESCRIPTION OF THE INVENTION

Figure 1:
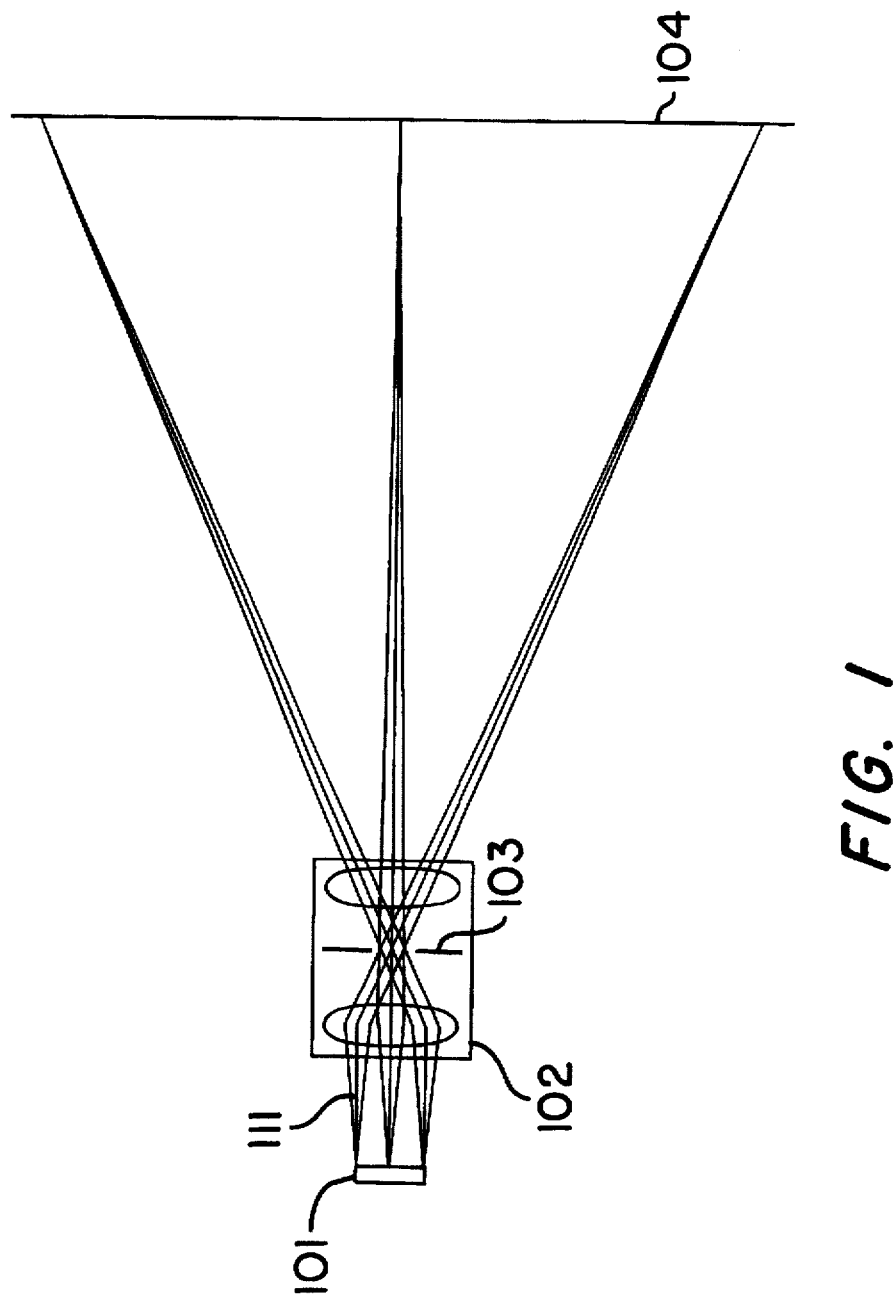
FIG. 1 is an outline view showing an example of an image projecting optical system of an image projecting apparatus according to the present invention.
Figure 2:
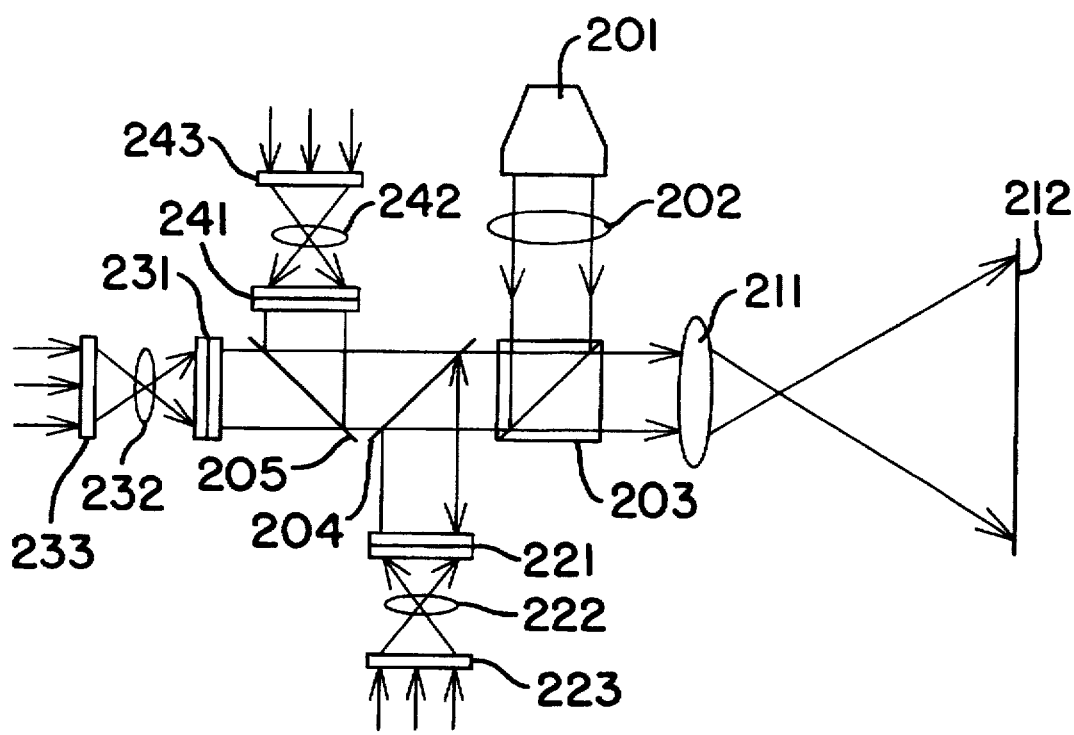
FIG. 2 is a structural view showing a conventional reflecting type liquid crystal image projecting apparatus.

FIG. 1 is a simple outline view showing an example of an image projecting optical system of an image projecting apparatus according to the present invention.

The image projecting apparatus using a spatial light modulating element is composed of a light source, a spatial light modulating element, an illuminating optical system for irradiating a light from the light source to the spatial light modulating element, and a projecting optical system for projecting an image of the spatial light modulating element. FIG. 1 is a simple outline view showing an example of a projecting optical system in the image projecting apparatus showing that it constitutes a telecentric optical system.

A luminous flux 111 emitted from a spatial light modulating element 101 is incident on a projecting lens system 102, is contracted by a light shielding frame 103 and forms an image on a screen 104. When the spatial light modulating element 101 is of a transmitting type, an illuminating luminous flux is irradiated on the space light modulating element 101 from the side opposite to the projecting lens system 102 whereas, when it is of a reflecting type, the illuminating luminous flux is irradiated on the space light modulating element 101 from the side of the projecting lens system 102 by using a polarized beam splitter etc., respectively. The light shielding frame 103 is arranged at a post-focus face of the telecentric optical system and is provided with a circular or polygonal opening at its central portion. Further, the shape of the opening can be changed in accordance with the necessity. It is possible to control only an angular component of the luminous flux 111 incident on the projecting lens system 102 by changing the shape of the opening.

For example, suppose a case wherein the spatial light modulating element 101 is provided with a contrast characteristic depending on an incident angle, that is, the larger the incident angle, the lower the contrast. At that moment, if an image quality having a large contrast is required by a surrounding environment, a property of a projected image etc., a luminous flux having a large angular component is shielded by contracting the light shielding frame 103 and is adjusted to provide a desired contrast. Meanwhile, in a case where a highly bright image quality is required, a luminous flux having a large angular component is transmitted by releasing the light shielding frame 103 thereby adjusting to provide a highly bright image quality.

Further, it is possible to adjust the image quality in conformity with a surrounding environment by providing a structure wherein an environment detecting means is provided for measuring a brightness in a room etc., whereby an environment surrounding the image projecting apparatus or the projected image is detected and a light shield frame shape changing means is provided for changing the shape of the light shield frame 103 in accordance with a result of the detection, for example, by considerably releasing the light shielding frame 103 when a highly bright image quality is required in a bright room etc. The image projecting apparatus of the present invention can easily adjust the qualities of the projected image without deteriorating the light source or the spatial light modulating element by controlling the shielded amount of light, that is, the angle component of the luminous flux in correspondence with the environment surrounding the image projecting apparatus or the projected image.

EMBODIMENT

Figure 4:
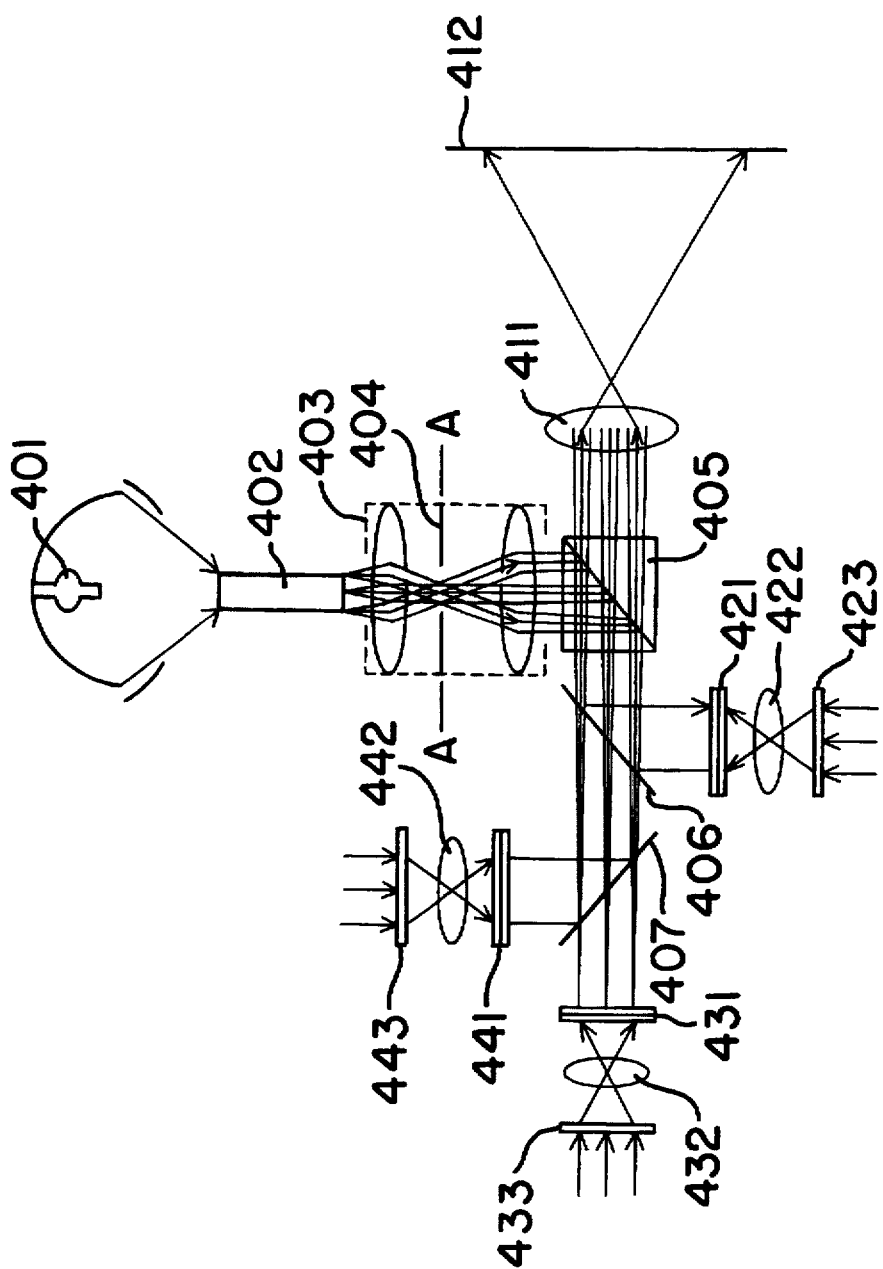
FIG. 4 is a structural view showing a first embodiment of an image projecting apparatus according to the present invention.

An explanation will be given of embodiments of the present invention in reference to the drawings as follows.
(1) First Embodiment FIG. 4 is a structural view of a first embodiment of an image projecting apparatus of the present invention.

Figure 3:
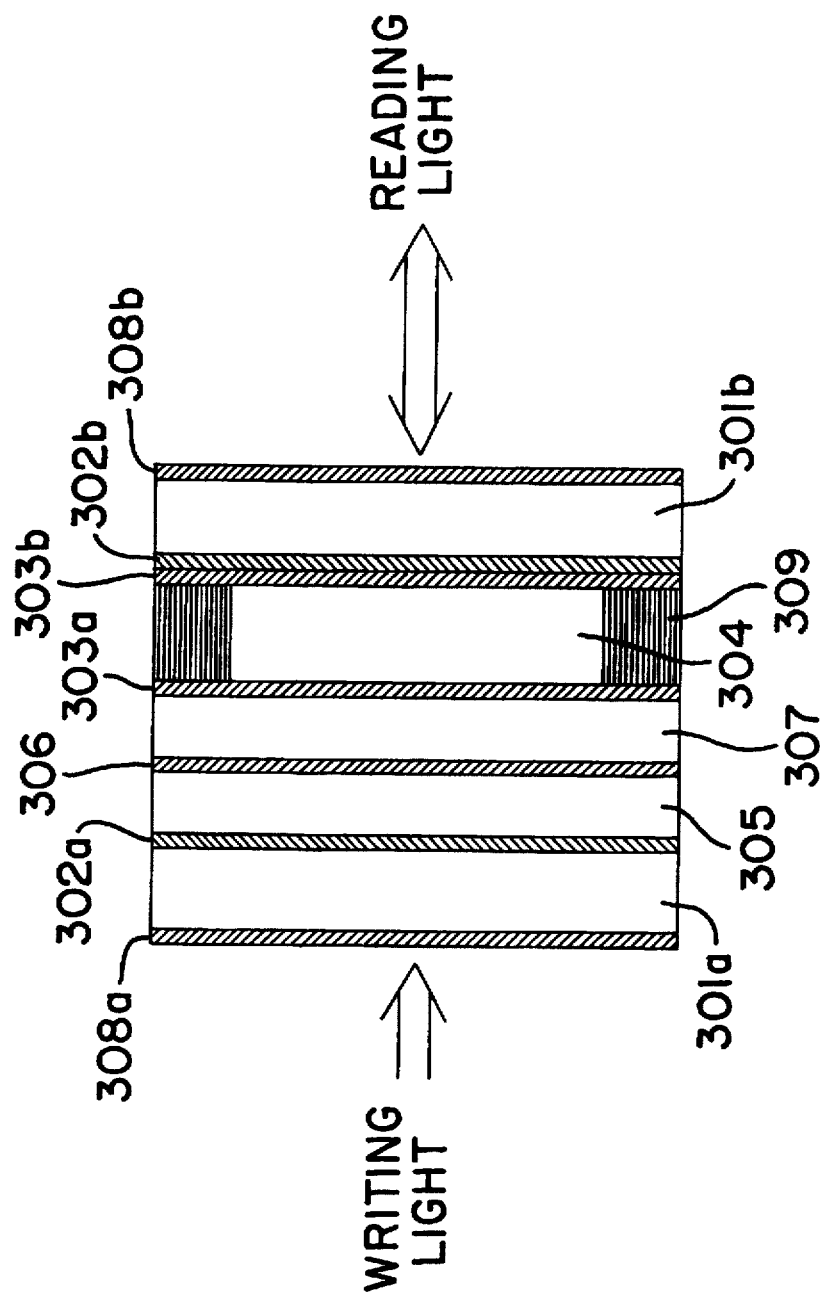
FIG. 3 is a sectional view showing a structure of a reflecting type optical writing liquid crystal light valve.

The basic structure is composed of a plurality of reflecting type optical writing liquid crystal light valves, writing means each for optically writing an image of each color component to each reflecting type optical writing liquid crystal valve by irradiating a writing light from the side of one face thereof, a polarized light illuminating optical systems each for reflectively reading the image of each color component written to each reflecting type optical writing liquid crystal light valve by irradiating a polarized light illuminating luminous flux of a corresponding color component from the side of a face opposite to the face on which the writing light of each reflecting type optical writing liquid crystal light valve is irradiated and a projecting optical system for synthesizing, magnifying and projecting the images of the respective color components which have been read thereby projecting an image. The reflecting type optical writing liquid crystal is the same as that explained by using FIG. 3.

A specific explanation will be given of the structure of a reflecting type liquid crystal image projecting apparatus.

This reflecting type liquid crystal image projecting apparatus is constituted by three sheets of reflecting type optical writing liquid crystal light valves 421, 431 and 441. That is, it includes a reflecting type optical writing liquid crystal light valve (hereinafter, R-SLM) 421 which is allocated with a red image among those having three elementary colors of red, green and blue, a reflecting type optical writing liquid crystal valve (G-SLM) 431 which is allocated with a green image and a reflecting type optical writing liquid crystal light valve (hereinafter, B-SLM) 441 which is allocated with a blue image. The reflection type liquid crystal image projecting apparatus is provided with TFT liquid crystal panels 423, 433 and 443 and writing lenses 422, 432 and 442 as writing means for respective images of respective color components. A red component image displayed by the R-TFT 423 is optically written on a writing face of the R-SLM 421 by the R-writing lens 422. Similarly, a green component image displayed by the G-TFT 433 is optically written on a writing face of the G-SLM 431 by the G-writing lens 432. Furthermore, a blue component image displayed by the B-TFT 443 is optically written by the B-SLM 441 by the B-writing lens 442.

Meanwhile, the apparatus includes as an illuminating optical system, a light source 401, a rod integrator 402, an illuminating lens system 403, a light shielding frame 404, a polarized beam splitter (hereinafter, PBS) 405, a red reflecting dichroic mirror (hereinafter, R-DM) 406 and a blue reflecting dichroic mirror (hereinafter, B-DM) 407. A luminous flux emitted from the light source 401 is incident on one end face of the rod integrator 402 and after emitting from the opposite end face, it becomes an illuminating luminous flux irradiating on the reflecting type optical writing liquid crystal light valves 421, 431 and 441 by the illuminating lens system 403. This illuminating luminous flux is split into mutually orthogonal polarized light illuminating luminous fluxes by the PBS 405. When one polarized light illuminating luminous flux reflected from the PBS 405 is assumed to be a s polarized light, the other polarized light illuminating luminous flux transmitted through the PBS 405 becomes a p polarized light. Only a red component of the s polarized light component separated by the PBS 405 is selectively reflected by the R-DM 406 and reflectively reads a red component image by illuminating the R-SLM 421. The remaining color component which have transmitted through the R-DM 406 are separated into a green component and a blue component by the B-DM 407. The green component which has transmitted through the B-DM 407 is irradiated on the G-SLM 431 and reflectively reads a green component image.

Meanwhile, the blue component reflected by the B-DM 407 is irradiated on the B-SLM 441 and reflectively reads a blue component image. The three kinds of the red component image, the green component image and the blue component image which have been read in such a way, are again synthesized by the B-DM 407 and the R-DM 406, the synthesized transmits through the PBS 405 and is magnified and projected on a screen 412 in front via a projecting lens 411. As a result, an image is projected on the surface of the screen 412.

The illuminating lens system 403 is composed of a dual telecentric optical system wherein the major beam of the illuminating luminous flux is orthogonally incident on the reflecting type optical writing liquid crystal light valves 421, 431 and 441. The light shielding frame 404 is disposed on a focus face of the dual telecentric optical system.

The rod integrator 402 is a prism made of quartz glass and respective faces thereof are optically ground.

The luminous flux emitted from the light source 401 is focused on and incident on an incident side end face of the rod integrator 402. The incident luminous flux becomes a luminous flux having a uniform light amount at an emitting end face after repeating a plurality of total reflections on side faces of the rod integrator 402. Accordingly, by forming an image from the emitting side end face of the rod integrator 402 on the reflecting type optical writing liquid crystal light valves 421, 431 and 441 by the illuminating lens system 403, the illuminating luminous flux is irradiated uniformly on the reflecting type optical writing liquid crystal light valves 421, 431 and 441 without nonuniformity of brightness. As conjugate relationships the incident side end face of the rod integrator 402 is conjugate with the position of the light shielding frame 404 and the emitting end face of the rod integrator 402 is respectively conjugate with the reflecting type optical writing liquid crystal light valves 421, 431 and 441.

Here, changing the size of the opening of the light shielding frame 404 is controlling a solid angle of a luminous flux which has been emitted from the illuminating lens system 403 and is irradiated on the reflecting type optical writing liquid crystal light valves 421, 431 and 441.

Further, the PBS 405 is provided with a function of separating the illuminating luminous flux into linearly polarized lights by separating it respectively into p and s polarized lights and a function of transmitting only the p polarized light component which has been converted and reflected by the reflecting type optical writing liquid crystal light valves 421, 431 and 441 in correspondence with image information that has been optically written and projecting it as an image. Accordingly, the characteristic of the PBS 405 here influences on the image qualities, especially the contrast of the projected image.

Generally, the characteristic of the PBS 405 in separating the p and s polarized lights is dependent on the incident angle on the PBS 405 wherein the larger the incident angle, the lower becomes the separating characteristic. Especially, in using it in a total of a wide waveband of 400 through 700 nm, the incident angle dependency on the separation characteristic becomes more considerable. That is, in case where, for example, an image quality having a large contrast is necessary for the projected image, it is required to block a luminous flux having a large incident angle to the PBS 405. Meanwhile, in case where, for example, an image quality having a large brightness is necessary, it is required to transmit a luminous flux having a large incident angle to the PBS 405 as much as possible. In this way, it is possible to adjust the qualities of the projected image by changing the size of an opening of the light shielding frame 404 thereby controlling the angular component of the luminous flux incident on the PBS 405.

Further, the light shielding frame 404 blocks an unnecessary luminous flux emitted from the illuminating lens system 403 and therefore, it is possible to restrain lowering of function in the reflecting type optical writing liquid crystal light valves 421, 431 and 441 etc. caused by absorbing the unnecessary light whereby they are heated.

Figure 5:
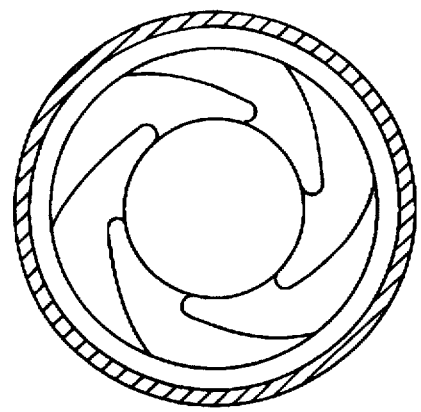
FIG. 5 is an outlook view showing a light shielding frame of the first embodiment of an image projecting apparatus according to the present invention.

FIG. 5 illustrates a shape of the light shielding frame 404 and is a sectional view taken from the line A—A of the illuminating lens system 403 in FIG. 4.

Further, a similar adjustment of the image qualities can naturally be performed not by the illuminating lens system 403 but by composing the projecting lens 411 by a telecentric optical system and providing a light shielding frame similar to the light shielding frame 404 at the focus position of the telecentric optical system.

(2) Second Embodiment

Figure 6:
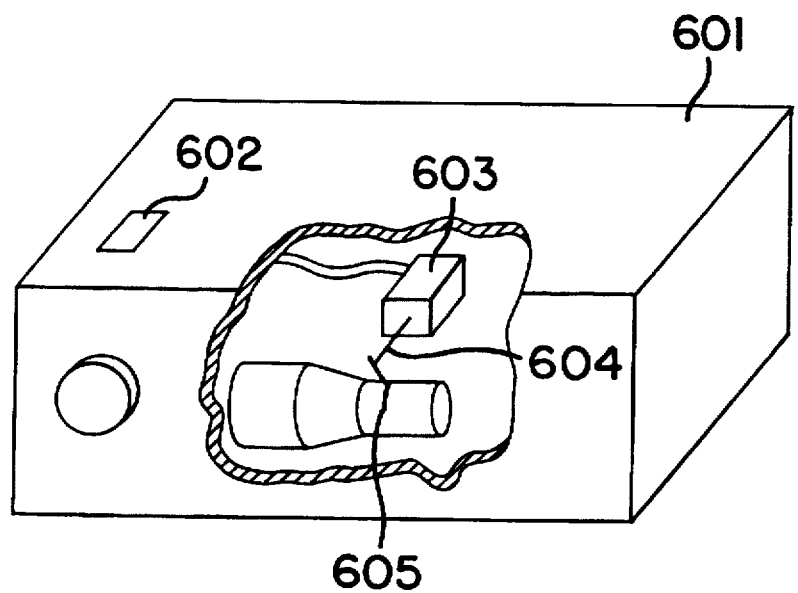
FIG. 6 is an outlook and sectional view showing a second embodiment of an image projecting apparatus according to the present invention.

FIG. 6 is an outlook and sectional view of a second embodiment of an image projecting apparatus of the present invention. The structure and the function of the image projecting apparatus are the same as those in the first embodiment.

A brightness meter 602 is arranged on the upper portion of an outer frame 601 for measuring the brightness in a room. These measuring data are sent to a light shielding frame driving unit 603. The light shielding frame driving unit 603 moves a cylinder 604 and changes the shape of an opening of a light shielding frame 605 in correspondence with the data.

For example, in a dark room the high contrast is more necessary than the brightness of an image whereas in case where an illumination is switched on and the room becomes bright, it is conceivable that an image having a high brightness may be required. Therefore, the shape of the opening of the light shielding frame 605 is changed in accordance with the brightness in respective rooms whereby the image qualities required as mentioned above with regard to FIG. 5 can be achieved.

It is possible to in this way to change automatically the image qualities in accordance with a change in an environment.

As mentioned above, according to the present invention, in an image projecting apparatus including a light source, a spatial light modulating element, an illuminating optical system for irradiating a light from the light source on the spatial optical modulating element and an image projecting optical system for projecting an image of the spatial optical modulating element, the illuminating optical system or the projecting optical system is constituted by a telecentric optical system, a light shielding frame capable of changing a circular or polygonal shape centering on an optical axis is provided at a focus location of the telecentric optical system and further, an environment detecting means for detecting an environment surrounding the image projecting apparatus or the projected image and a light shield frame shape changing means for changing a shape of the light shielding frame in correspondence with a result of detection by the environment detecting means are provided, whereby the image qualities of a projected image can easily be adjusted without deteriorating the light source or the spatial beam modulating element by controlling an amount of light to be shielded in accordance with the environment surrounding the image projecting apparatus or the projected image.

What is claimed is:

1. An image projecting apparatus comprising:
   a light source for emitting light;
   a spatial light modulating element;
   an illuminating optical system for irradiating a light from the light source onto the spatial light modulating element, the illuminating optical system comprising a telecentric optical system and a light shielding frame disposed at a focus position of the telecentric optical system for controlling an angular component of a luminous flux of the light emitted by the light source; and
   a projecting optical system for projecting an image of the spatial light modulating element.

2. An image projecting apparatus according to claim 1; further comprising environment detecting means for detecting an environment surrounding the image projecting apparatus or the projected image; and
   light shielding frame shape changing means for changing the shape of the light shielding frame in accordance with the surrounding environment detected by the environment detecting means.

3. An image projecting apparatus according to claim 2; wherein the light shielding frame shape changing means includes means for changing the shape of the light shielding frame between a circular shape and a polygonal shape.

4. An image projecting apparatus according to claim 1; further comprising a rod integrator for receiving the luminous flux emitted by the light source and outputting an illuminating luminous flux having a uniform quantity of light.

5. An image projecting apparatus according to claim 4; wherein the rod integrator comprises a transparent member having opposite end surfaces, the luminous flux emitted by the light source being received by one of the end surfaces of the rod integrator.

6. An image projecting apparatus comprising:
   a light source for emitting light;
   a spatial light modulating element;
   an illuminating optical system for irradiating light from the light source onto the spatial light modulating element; and
   a projecting optical system for projecting an image of the spatial light modulating element, the projecting optical system comprising a telecentric optical system and a light shielding frame disposed at a focus position of the telecentric optical system for controlling an angular component of a luminous flux of light emitted by the spatial light modulating element.

7. An image projecting apparatus according to claim 6; further comprising environment detecting means for detecting an environment surrounding the projected image, the angular component of the luminous flux of light being controlled in accordance with the surrounding environment detected by the environment detecting means.

8. An image projecting apparatus comprising: a light source for emitting light; a spatial light modulating element for Providing an image; first optical means for irradiating light from the light source onto the spatial light modulating element; second optical means for projecting the image provided by the spatial light modulating element; and control means included in the first optical means for controlling an angular component of a luminous flux of light from either the light source or the spatial light modulating element to adjust the quality of the projected image, the control means comprising a telecentric optical system and a light shielding frame disposed at a focus position of the telecentric optical system for controlling an angular component of the luminous flux of light emitted by the light source.

9. An image projecting apparatus according to claim 8; further comprising environment detecting means for detecting an environment surrounding the projected image, the angular component of the luminous flux of light being controlled in accordance with the surrounding environment detected by the environment detecting means.

10. An image projecting apparatus according to claim 9; further comprising means for changing the shape of the light shielding frame to control the angular component of the luminous flux of light.

11. An image projecting apparatus comprising: a light source for emitting light; a spatial light modulating element for providing an image; first optical means for irradiating light from the light source onto the spatial light modulating element; second optical means for projecting the image provided by the spatial light modulating element; control means for controlling an angular component of a luminous flux of light from either the light source or the spatial light modulating element to adjust the quality of the projected image; and a rod integrator for receiving the luminous flux of light emitted by the light source and outputting an illuminating luminous flux having a uniform quantity of light.

12. An image projecting apparatus according to claim 11; wherein the rod integrator comprises a transparent member having opposite end surfaces, the luminous flux emitted by the light source being received by one of the end surfaces of the rod integrator.

13. An image projecting apparatus comprising: a light source for emitting light; a spatial light modulating element for providing an image; first optical means for irradiating light from the light source onto the spatial light modulating element; second optical means for projecting the image provided by the spatial light modulating element; and control means included in the second optical means for controlling an angular component of a luminous flux of light from either the light source or the spatial light modulating element to adjust the quality of the projected image, the control means comprising a telecentric optical system and a light shielding frame disposed at a focus position of the telecentric optical system for controlling an angular component of the luminous flux of light emitted by the spatial light modulating element.

14. An image projecting apparatus according to claim 13; further comprising environment detecting means for detecting an environment surrounding the projected image, the angular component of the luminous flux of light being controlled in accordance with the surrounding environment detected by the environment detecting means.

15. An image projecting apparatus according to claim 14; further comprising means for changing the shape of the light shielding frame to control the angular component of the luminous flux of light.

* * * * *